UNITED STATES PATENT OFFICE 3,379,647
Patented Apr. 23, 1968

3,379,647
METAL CARBIDE AND BORIDE
PRODUCTION
Paul A. Smudski, Grand Island, N.Y., assignor to The
Carborundum Company, Niagara Falls, N.Y., a corporation of Delaware
No Drawing. Filed May 4, 1966, Ser. No. 547,436
22 Claims. (Cl. 252—301.1)

ABSTRACT OF THE DISCLOSURE

An intimate reactive mixture suitable for the production of metal carbides by carbothermic reduction is prepared by forming a mutual solution of a suitable carbon source and a source of an oxide of a carbide-forming metal. An intimate reactive mixture suitable for the production of metal borides by carbothermic reduction is prepared by forming a mutual solution of a suitable carbon source and a boric oxide source, with a source of an oxide of a boride-forming metal slurried or dissolved therein. Such reactive mixtures may be heated to produce the corresponding metal carbide or boride.

The present invention relates to improved processes for the production of metal carbides and borides, and to metal carbides and borides produced thereby.

Metal carbides in general have become the subject of increasing attention in recent years, as a result of the wide range of useful properties which they have been found to possess. The refractory metal carbides in particular have been of interest as a result of their high melting points and consequent ability to withstand the high temperatures which are encountered in many fields of modern technology. Many of these metal carbides display great hardness and accordingly fine powders of such metal carbides are often employed as abrasives, in which application they possess considerable wear resistance. Alternatively, such powders are often capable of being hot pressed into a wide variety of useful shapes. Corrosion resistance is another important property of many of these metal carbides. In addition to the foregoing general properties and utilities of compounds of the metal carbide class, certain specific uses have been made of particular metal carbides, among which may be mentioned the use of high purity silicon carbide in semiconductors and the use of uranium carbide as a nuclear reactor fuel. Similarly, the extreme refractoriness and corrosion resistance of boron carbide in a highly pure state of considerable interest in connection with the formation of boron carbide into useful articles. For purposes of the present invention, silicon and boron are considered metals.

Metal borides as a class bear a marked similarity to metal carbides in many respects, and accordingly much interest has been generated in the metal borides for much the same reasons as mentioned above in connection with the metal carbides. Refractory metal borides are of great interest in connection with high temperature applications, and many metal borides exhibit the highly desirable properties of hardness, refractoriness, wear resistance and corrosion resistance.

A variety of processes have been employed for the preparation of carbides of various metals, and a number of these processes are discussed in Schwarzkopf and Kieffer, "Refractory Hard Metals" (The MacMillan Co., New York, 1953) page 47 et seq. These processes vary considerably with regard to their adaptability to large scale production methods. Perhaps the most generally prefered commercial process, and one which has been extensively employed for the large scale production of many metal carbides, involves the principle of a carbothermic reduction of metal oxides. According to such a process, a reactive mixture is prepared comprising a carbon source such as finely divided carbon, and a metal oxide source such as a metal oxide and/or a metal compound which will form a metal oxide upon heating; and the mixture is fired at a relatively high temperature, whereby the metal oxide which is present initially or which is formed thereupon is reduced, the corresponding metal carbide or carbides being concomitantly produced. Such reactions ordinarily proceed according to the general equation $$MeO + 2C \rightarrow MeC + CO \text{ or } 2MeO + 3C \rightarrow 2MeC + CO_2$$

in which Me represents the metal involved. Such reactions may, of course, be carried out in any of a number of types of furnaces well known in the art. The temperature of firing is generally in the range of 1100–2300 C., the temperature being selected according to the particular metal carbide or carbides to be produced. The reaction is generally carried out in protective, non-interfering atmosphere, such as an inert gas or a vacuum. Many different metal carbides have been prepared according to this process, among which may be listed the carbides of titanium, zirconium, hafnium, vanadium, niobium, tantalum, chromium, molybdenum, tungsten, and uranium, as well as a number of other transition metals. An analogous process has long been in use for the commercial production of silicon carbide according to the process described by Acheson in U.S. Reissue Patent 11,473 and U.S. Patent 560,291, which process involves heating a reactive mixture containing silica and carbon in an electric resistance furnace. Similarly, a well-known process for the commercial production of boron carbide involves heating a reactive mixture containing boric oxide and carbon in an electric furnace to reduce the boric oxide and form boron carbide.

Likewise, borides of various metals have been produced by a number of different processes, some of which are discussed in Schwarzkopf and Kieffer, supra, at page 271 et seq.; and again these processes vary in their adaptability to commercial production purposes. By analogy with the foregoing method of metal carbide production, however, a preferred process for the large scale production of various metal borides is based upon the carbothermic reduction of boric oxide and one or more oxides of boride-forming metals. According to this general process, a reactive mixture is prepared comprising a carbon source such as finely divided carbon, and a metal oxide source comprising (1) one or more oxides of boride-forming metals and/or metal compounds which will form such metal oxides upon heating, and (2) a boric oxide source such as boric oxide itself and/or a substance which will form boric oxide upon heating; and the mixture is fired at a suitable temperature in a non-interfering atmosphere in any suitable furnace, whereby the metal oxides which are present initially or which are formed thereupon are reduced and the reduction products thereof interact, the corresponding metal boride or borides being concomitantly produced. Numerous metal borides have been produced according to such a process, including, for example, titanium, zirconium, hafnium, vanadium, tantalum, and nickel borides.

Although the above-mentioned carbothermic reduction processes for the preparation of metal carbides and borides are highly advantageous with respect to their suitability for large scale production and their use of relatively inexpensive raw materials, certain serious drawbacks have long been recognized in such processes. More particularly, it has been generally observed in conventional practice that the metal carbides and borides prepared according to such processes tend to be produced in the furnace in the form of massive pieces, rather than as a fine powder. Since it is almost invariably desired to utilize the various metal carbides and borides in the form of a fine powder, it is necessary to subject the massive pieces formed in the furnace to grinding and milling operations in order to obtain such powders; and, since the metal carbides and borides are generally extremely hard, such milling operations are necessarily quite difficult, time-consuming and costly. Moreover, the abrasive nature of many of these metal carbides and borides frequently tends to result in serious contamination in the powdered product due to abrasion of the apparatus during the milling operation. Another major shortcoming of the aforementioned processes is that the product formed in the furnace is usually quite non-homogeneous, and samples of the product taken from various parts of the furnace may vary markedly in their composition. While this undesirable feature can be remedied to some extent by grinding and a fairly uniform powder obtained thereby, batch-to-batch variation in powder composition is more difficultly controllable. Thus, in general, the carbothermic reduction processes for the preparation of large quantities of metal carbides and borides present formidable obstacles to obtaining powdered products of high purity and of stoichiometrically well-defined and controlled composition.

Since the carbothermic reduction processes for the preparation of metal carbides and borides involve a reaction of two or more commingled solids, a process variable which is of critical importance is the intimacy of the mixture of the solid reactants. A high degree of intimacy of mixture of the reactants will favor a complete reaction of the ingredients. This in turn permits greater control of the stoichiometry of the final product, and favorably influences the purity of the product by minimizing the presence of unreacted raw materials therein, and also tends to result in a more uniform product in the furnace.

The importance of achieving a high degree of intimacy of the reactant mixture has long been recognized, and various methods have been employed in an attempt to attain this intimacy. Perhaps the method most frequently employed is wet or dry ball milling. Other methods of overcoming the problem of obtaining an intimate reaction mixture include the method of U.S. Patent 2,364,123, which involves the preparation of numerous metal carbides by heating a mixture of carbon and a metal oxide under pressure in a non-oxidizing atmosphere, the pressure serving to create and maintain very intimate contact of the reactants during heating. Furthermore, the method of this patent contemplates wetting the reactant mixture with a small amount of a hydrocarbon which decomposes during the heating under pressure to furnish a certain amount of well-distributed reactive carbon. A somewhat more sophisticated approach is set forth in U.S. Patent 3,085,863, which discloses a method of preparing highly pure silicon carbide powder by adding to an aqueous sucrose solution, a quantity of silicon tetrachloride in approximately the stoichiometric proportion for the formation of silicon carbide, to form a gel which consists of hydrated silica and sucrose. Upon heating the gel to about 250° C., the silica is dehydrated and the sugar is reduced to carbon, resulting in a finely divided mixture of silica and carbon which, upon heating to about 1800° C. in an inert atmosphere, is converted to silicon carbide powder.

Similarly, attempts have been directed to obtaining more intimate reactive mixtures for the preparation of metal borides. For example, U.S. Patent 2,964,388 employs an aqueous slurry to obtain an intimate mixture of hydrous zirconia and carbon, to which boric acid is added, and after drying the mixture at 250° C., the residue is calcined at 1400–1700° C. to yield finely divided zirconium boride. U.S. Patent 2,973,247 teaches an analogous process for the preparation of titanium boride.

It is apparent from a consideration of the foregoing that, while some forward strides have been made in seeking to overcome the problems involved in obtaining a high degree of intimacy of reactant mixtures for the preparation of metal carbides and borides by carbothermic reduction, the methods which heretofore have been employed suffer from certain inherent limitations. Since most of these methods are directed solely to purely physical means of commingling, they are inherently limited by purely physical concepts such as the particle size of the reactants to be mixed. While the method of U.S. Patent 3,085,863 is not so limited, it involves the use of a fairly expensive raw material; moreover, the basic concept of this method would not be generally applicable to the formation of compounds other than silicon carbide. By contrast, the methods contemplated by the present invention provide a means of obtaining reactive mixtures approaching the atomic or molecular level, which therefore represent the practicable ultimate in intimacy. Furthermore, these methods are generally applicable to the formation of all metal carbides and borides which can be produced by carbothermic reduction.

Accordingly, it is a principal object of this invention to provide methods whereby an extremely high degree of intimacy may be achieved in reactive mixtures which are to be heated to form metal carbides or borides by carbothermic reduction, and thereby to derive the various advantages which accompany such intimacy of mixture, viz., a more complete interaction of the reactants upon firing, accompanied by a more effective control of stoichiometry and purity in the product.

It is also an object of this invention to obtain such intimate mixtures by employing source materials which, in general, are readily and economically available in a comparatively pure state in contrast to the raw materials employed in many present conventional processes, and thereby to attain products of superior purity.

It is a further object of this invention to produce, by heating such intimate mixtures, metal carbides and borides which generally are in the form of powders rather than the massive lumps produced by many present conventional processes, which powders are often fine enough to be hot pressable directly to form bodies of acceptable densities without the necessity of milling and the consequent problem of contamination.

In order to form an extremely intimate reactive mixture for the preparation of metal carbides and borides according to the present invention, a suitable solvent is employed to form a dispersion of appropriate amounts of a carbon source and a metal oxide source. The carbon source utilized is a carbon-containing compound which will form carbon upon heating. The metal oxide source employed for the preparation of metal carbides may comprise an oxide of a carbide-forming metal or a compound which, upon heating, will form such an oxide. The metal oxide source employed for the preparation of metal borides comprises at least two constituents: (1) a source of an oxide of a boride-forming metal, including such oxides and substances which will form such oxides upon heating, and (2) a boric oxide source, including boric oxide itself and substances which will form boric oxide upon heating.

The carbon source selected is, in all cases, one which is capable of dissolving in the solvent employed. Likewise, the metal oxide source selected for the formation of metal carbides is one which is capable of dissolving in that solvent. The metal oxide source selected for the formation of metal borides is such that at least the boric oxide constituent thereof is capable of dissolving in the solvent employed, while the source of an oxide of the boride-forming metal may, but need not, be capable of dissolving in the solvent. Accordingly, dispersions prepared according to the methods of the invention for the preparation of metal carbides will comprise a mutual solution of appropriate amounts of a carbon source and a metal oxide source. Dispersions for the preparation of metal borides may thus comprise either a mutual solution of both the carbon and metal oxide sources or a mutual solution of the carbon and boric oxide sources having slurried therein a source of an oxide of a boride-forming metal.

The dispersions thus formed may be employed directly for the preparation of metal carbides or borides by placing them in a furnace set at a suitable temperature. Such a procedure has generally proven to be impractical, however, because violent boiling of the solvent tends to occur, with consequent splashing in the furnace. This may be overcome by placing the dispersion in a furnace at low temperature and increasing the temperature to a range in which the dispersion is gently reduced to substantial dryness, and then increasing the temperature to obtain the desired reaction. Both of the foregoing methods are disadvantageous, however, in that economical use is not made of the available furnace space.

To avoid the foregoing difficulties, it is generally preferred to carry out the heating in a plurality of steps. Preferably, the reactive mixture in the form of a dispersion is first heated at a moderate temperature, e.g., from about 100° C. to about 500° C., using an oven or any other suitable heat source, until a substantially dry reactive mixture is formed, which may then be heated at a substantially higher temperature to form the metal carbide or boride. The residue, or dry reactive mixture, obtained by the moderate heating comprises two reactive components in intimate admixture: (1) a carbonaceous component derived from the carbon source and consisting essentially of carbon or an intermediate in the formation of carbon from the carbon source; and (2) a metal-containing component which may contain one or more of the substances constituting the metal oxide source, or one or more metal oxides or intermediates in the formation thereof from the metal oxide source. This residue, which often forms as a glass-like mass and is frequently referred to hereinafter as the "reactive mass," may be heated according to conventional techniques to temperatures suitable for forming the corresponding metal carbide or boride by carbothermic reduction.

The precise composition of the reactive mass will depend upon the various starting materials and the conditions of moderate heating. In the simplest case, the reactive mass would theoretically consist essentially of carbon and one or more metal oxides. To the extent that more complex substances or intermediates are present, however, the undesirable contents thereof are presumably driven off at the higher temperatures employed during firing. In any case, the carbides and borides formed according to this invention are, in general, obtained as fine powders of comparatively high purity and rather well-defined stoichiometry.

The invention will be further described in conjunction with the following examples, which are intended to illustrate and not to limit the inventive concepts.

EXAMPLE 1

A mixture of 1200 g. of boric acid, 750 g. of sucrose and 400 ml. of ethylene glycol was placed in an oven set at a temperature of about 175° C., and a solution formed shortly thereafter. Heating was continued for about 12 hours at about 175° C. and a dry, black, glassy solid was obtained. Portions of this reactive mass were placed in a graphite crucible which was placed in an induction furnace under an argon atmosphere, and the temperature was brought to 1800° C. where it was held for 1 hour. The product was then allowed to cool under an argon atmosphere. The product obtained thereby was a black powder having a particle size range of 3–30 microns. X-ray diffraction identified the product as boron carbide, $B_4C$.

EXAMPLE 2

A mixture of 1200 g. of boric acid, 970 g. of sucrose, and 200 ml. of ethylene glycol was placed in an oven set at about 175° C., and a solution formed shortly thereafter. Heating at about 175° C. was continued for about 17 hours, a dry, black, glassy solid being produced. A portion of this reactive mass was placed in a graphite crucible which was placed in an induction furnace under an argon atmosphere, and the temperature was brought to 1800° C. where it was held for 3 hours. The product was then allowed to cool under an argon atmosphere. The product, identified by X-ray diffraction as $B_4C$, was a black powder having a particle size range of 5–150 microns.

EXAMPLE 3

A mixture of 1200 g. of boric acid, 1050 g. of sucrose, and 200 ml. of ethylene glycol was placed in an oven set at about 175° C., and a solution formed shortly thereafter. The solution was dried by continuing to heat at about 175° C. for 17 hours, and a dry, black, glassy-looking solid was obtained. The hot zone of a resistance-heated tube furnace was brought to a temperature of 1900° C. and held at that temperature, and a graphite boat loaded with a portion of the reactive mass was pushed into the hot zone and held there for 30 minutes, then pushed into the cold end of the furnace tube for about 10 minutes to cool below temperatures at which oxidation of the product might occur. An argon atmosphere was maintained in the furnace throughout the operation. The product, identified by X-ray diffraction as $B_4C$, was a black powder having a particle size range of 0.5–15 microns.

EXAMPLE 4

A mixture of 1200 g. of boric oxide, 730 g. of sucrose, and 400 ml. of ethylene glycol was placed in an oven set at about 175° C. and the solution which presently formed was dried for 17 hours at about 175° C., a black solid being obtained. The reaction mass was placed in a graphite crucible which was placed in an induction furnace under an argon atmosphere, and the temperature was brought to 1700° C. where it was held for 1 hour. The product was then allowed to cool under an argon atmosphere. The product, identified by X-ray analysis as $B_4C$, was a black powder having a particle size range of 1–150 microns.

EXAMPLE 5

A solution was prepared by gently heating a mixture of 40 g. of anhydrous borax ($Na_2B_4O_7$), 40 g. of sucrose, and 40 ml. of ethylene glycol with occasional stirring. The solution was placed in a stainless steel tray and dried for 10 minutes in a muffle furnace set at 500° C. to obtain a black, fluffy solid which was then heated at 1900° C. for 2 hours in an induction furnace with an argon atmosphere. A black powder was obtained, which was found by X-ray diffraction analysis to consist primarily of boron carbide, with some graphite present.

EXAMPLE 6

A mixture of 140 g. of boric acid, 97 g. of sucrose, and 20 ml. of diethylene glycol in a beaker was heated at about 250° C. for about 30 minutes to form a solution, which was then further heated at a temperature of about 260° C. for about 30 minutes to yield a black, glassy solid. The reactive mass was placed in a graphite crucible and heated at 2000° C. for 1 hour in an induction furnace with an argon atmosphere to obtain a fine powder which was identified by X-ray diffraction as boron carbide.

EXAMPLE 7

A mixture of 30 g. of boric acid, 24.5 g. of sucrose, and 5 ml. of dimethyl sulfoxide was placed in a muffle furnace set at 400° C. for 10 minutes, during which period a solution first formed which then dried to a black solid. The reactive mass was placed in a graphite crucible and heated at 1900° C. for 1 hour in an induction furnace with an argon atmosphere, yielding a black powder which X-ray diffraction identified as boron carbide.

EXAMPLE 8

A mixture of 50 g. of boric acid, 4 g. of sucrose, and 100 ml. of N-methyl-2-pyrrolidone was stirred in a beaker while heating at a temperature of about 130° C. for about 15 minutes to form a solution, which was then further heated at about 300° C. for about 30 minutes to obtain a dry, black solid. This reactive mass was placed in a graphite crucible and heated at 2000° C. for 1 hour in an induction furnace with an argon atmosphere. The product, identified by X-ray diffraction as boron carbide, was a black powder having a particle size range of 5–10 microns.

EXAMPLE 9

A mixture of 60 g. of boric acid, 48.5 g. of dextrose, and 10 ml. of ethylene glycol was placed in a muffle furnace set at 225° C. for 10 minutes, during which period a solution formed which subsequently dried to a fluffy, black solid. This solid was placed in a graphite boat and fired for 30 minutes at 2000° C. in a tube furnace under an argon atmosphere. The product, shown by X-ray analysis to consist mainly of boron carbide but with graphite also present, was a black powder having a particle size range of 1–30 microns.

EXAMPLE 10

Approximately 5 g. of pentaerythritol was dissolved in about 5 ml. of ethylene glycol by heating to about 200° C. in a test tube. Approximately 5 g. of boric acid was then added to the solution and heating was continued until the boric acid dissolved. The solution was then further heated for about 10 minutes at a temperature of about 250° C. to obtain a black solid, which was fired in a graphite boat in a tube furnace under an argon atmosphere for about 16 hours at 2100° C. to obtain a black powder which was identified by X-ray analysis as boron carbide.

EXAMPLE 11

A mixture of 90 g. of boric acid, 23 g. of starch, and 40 ml. of ethylene glycol was heated in a beaker until a solution was obtained at a temperature of about 130–140° C. Thereafter, heating was continued for about 30 minutes at a temperature of about 250° C., a dry, black solid being obtained. This reactive mass was placed in a graphite boat and heated for 15 minutes at 2100° C. in a tube furnace under an argon atmosphere. The resulting product was a black powder having a particle size range of 10–30 microns, and was shown by X-ray diffraction analysis to be boron carbide.

EXAMPLE 12

A mixture of 60 g. of boric acid, 23 g. of starch, and 20 ml. of ethylene glycol was placed in a muffle furnace set at 500° C. for 12 minutes, during which period a solution first formed which subsequently dried to a black, fluffy solid. This reactive mass was placed in a graphite crucible and heated at 1800° C. for 30 minutes in an induction furnace under an argon atmosphere to produce a black powder which was identified by X-ray diffraction analysis as boron carbide.

EXAMPLE 13

A solution was prepared by heating 24 g. of boric acid and 15 g. of glycerine for about 15 minutes at a temperature of about 150° C. Upon continued heating at a temperature of about 250° C. for about 30 minutes, the solution was reduced to dryness, accompanied by considerable foaming, to leave a dry, brown, highly porous, glass-like solid. Upon heating this solid at 2000° C. for 1 hour in an induction furnace under an argon atmosphere a fine powder was obtained, a major portion of which was indicated by X-ray analysis to be boron carbide.

EXAMPLE 14

Eighty ml. of an aqueous solution containing 20.8 g. of sodium tungstate dihydrate ($Na_2WO_4 \cdot 2H_2O$) and 10 g. of sucrose was placed in a muffle furnace set at 200° C. for 30 minutes and a black solid was obtained. This reactive mix was placed in a graphite crucible which was placed in an induction furnace under an argon atmosphere, and the temperature was brought to 1600° C. where it was held for 1 hour. The product was then allowed to cool under an argon atmosphere. The product, a gray powder having a particle size range of 1–8 microns, was shown by X-ray analysis to contain WC as the major component with a faint indication of alpha-$W_2C$.

EXAMPLE 15

Eighteen g. of an aqueous sodium silicate solution assaying 30 percent $SiO_2$ was dissolved in a solution of 20 g. of sucrose in 100 ml. of water, and the resulting solution was heated for about 30 minutes at a temperature of about 120° C. to obtain a black solid. This reactive mass was then placed in a graphite crucible and heated at 1700–1800° C. for 1 hour in an induction furnace under an argon atmosphere. The powder obtained thereby was shown by X-ray analysis to consist essentially of alpha and beta silicon carbide (SiC). The product also contained 2.37 percent free silica.

EXAMPLE 16

Ten g. of sodium vanadate ($NaVO_3$) was dissolved in 50 m. of water, and 9 g. of sucrose was then added and dissolved. The solution was heated for approximately 30 minutes at a temperature of about 120° C. to obtain a dry, black solid which was then placed in a graphite crucible and heated at 1600° C. for 30 minutes under an argon atmosphere in an induction furnace. The product, a gray powder having a particle size range of 1–4 microns, was demonstrated by X-ray analysis to be vanadium carbide (VC).

EXAMPLE 17

A mixture of 31 g. of ammonium molybdate tetrahydrate [$(NH_4)_6Mo_7O_{24} \cdot 4H_2O$], 20 g. of sucrose, and 20 ml. of ethylene glycol in a beaker was heated at a temperature of about 150° C. for about 10 minutes until a solution formed, which was then further heated at a temperature of about 250° C. for about 30 minutes, whereby the solution was dried to yield a black solid. This reactive mass was then placed in a graphite crucible and heated at 1600° C. for 1 hour under an argon atmosphere in an induction furnace. The resulting product was shown by X-ray analysis to contain $Mo_2C$ and MoC as major constituents and a minor amount of graphite.

EXAMPLE 18

Fifteen g. of uranyl nitrate [$UO_2(NO_3)_2 \cdot 6H_2O$] and 5.68 g. of sucrose was placed in an evaporating dish and about 15 ml. of water was added thereto form a solution of the solids. The vessel containing the solution was then placed on a hot plate and the solution was heated to 95° C. at which temperature it was held for about 20 minutes, whereupon violent boiling began, apparently as the result of an exothermic reaction. The material was then removed from the hot plate, but it continued to boil for about 5 minutes, at the end of which time only solids remained. This material was again placed on the hot plate and heated for about 1 hour at about 100° C., the residue at that point appearing black, dry and rather porous and foam-like. This residue was crushed, and then pressed into a pellet, which was heated at 1575° C. for 5 hours under a dry helium atmosphere. The product was in the shape of a pellet which could easily be crushed to a powder of very fine particle size. X-ray diffraction analysis of the product revealed a major UC phase and faint $UO_2$ and $UC_2$ phases, and a lattice parameter for the UC of $a=4.9580$ A. which compares favorably with the generally accepted value of 4.959 A.

EXAMPLE 19

Example 18 was repeated, except that 5.94 g. of sucrose was used instead of 5.68 g. X-ray analysis showed the product to be UC containing minor amounts of $UO_2$ and $UC_2$, with a lattice parameter for the UC of $a=4.9576$ A.

EXAMPLE 20

16.4 g. of uranyl nitrate and 2.27 g. of a liquid, water-soluble phenol formaldehyde resole resin (Varcum Chemical Co., No. V-8121) were dissolved in about 15 ml. of water, and the resulting solution was processed as in Example 18 to obtain a product which was shown by X-ray analysis to contain UC. There were also indications to $UC_2$ and $UO_2$. The UC lattice parameter was $a=4.9588$ A.

EXAMPLE 21

Thirty g. of ammonium molybdate tetrahydrate $$[(NH_4)_6Mo_7O_{24} \cdot 4H_2O]$$

was dissolved in 100 ml. of water with heating, and 10 g. of boric acid and 10 g. of sucrose were dissolved in the solution thus formed. The solution was heated for about 30 minutes up to a maximum temperature of about 170° C. to obtain a dry, black solid. This reactive mass was placed in a graphite crucible which was placed in an induction furnace under an argon atmosphere, and the temperature was brought to 1800° C. where it was held for 1 hour. The product was then allowed to cool under an argon atmosphere. The resulting $Mo_2B$ product formed as small aggregates of crystals having an average particle size of about 2–3 microns. X-ray analysis showed that minor amounts of Mo and delta MoB were also present.

EXAMPLE 22

71.5 g. of sucrose, 61.5 g. of finely divided zirconium dioxide, 60 g. of boric acid, and 10 ml. of ethylene glycol were mixed in a beaker and heated to a temperature of about 150° C. for a period of about 15 minutes, whereupon a sucrose-boric acid solution was formed in the ethylene glycol, the zirconium dioxide being suspended therein. The mixture was then heated further for approximately 30 minutes at a temperature of approximately 250 °C. until a dry, black solid was obtained. This reactive mass was placed in a graphite crucible and heated at 1800° C. for 1 hour under an argon atmosphere in an induction furnace. The product, a light gray powder having a particle size range of 2–5 microns, was shown by X-ray analysis to be zirconium diboride.

EXAMPLE 23

71.5 g. of sucrose, 40 g. of finely divided titanium dioxide, 70 g. of boric acid, and 10 ml. of ethylene glycol were mixed in a beaker and heated for about 15 minutes at a temperature of about 150° C. to obtain a sucrose-boric acid-ethylene glycol solution having titanium dioxide slurried therein. This mixture was then further heated for about 30 minutes at a temperature of about 250° C. to obtain a dry, black solid. This reactive mass was placed in a graphite crucible and heated at 200° C. for 2 hours under an argon atmosphere in an induction furnace. The product, a light gray powder having a particle size range of 0.5–5 microns, was demonstrated by X-ray analysis to be titanium diboride.

In many of the foregoing examples the products obtained were quite pure. For instance, elemental analysis of the product obtained in Example 1 gave the following: B, 77.78%; C, 21.40%; $B_2O_3$, 0.0%; and the product obtained in Example 2 had the following analysis: B, 78.23%; C, 21.39%; $B_2O_3$, 0.03%. These analyses compare favorably with the theoretical values for $B_4C$: B, 78.28%; C, 21.72%. In other examples, the product contained minor amounts of unreacted components.

As may be seen from the foregoing examples, the carbon source employed in the inventive processes for the preparation of metal carbides and borides may be selected from an extremely wide variety of carbon-containing compounds. Some of the carbon sources which have been found useful are as follows: carbohydrates, including monosaccharides such as dextrose and other hexoses, disaccharides such as sucrose, and polysaccharides such as starch; various resins such as those of the phenolformaldehyde type; and polyhydric compounds such as glycerine, polyvinyl alcohol, and pentaerythritol. Sucrose has been found to be especially desirable as a carbon source by virtue of its relatively low cost and ready availability in substantially pure form. However, the only essential prerequisites for a carbon-containing compound which may successfully be employed in the processes of this invention as the carbon source are that the compound be capable of dissolving in the solvent employed and that, upon heating, it will decompose to form carbon. It is not necessary that the carbon source be capable of dissolving in the solvent at room temperature, it being quite sufficient that a homogeneous liquid phase occurs before appreciable deposition of the carbonaceous component occurs. Moreover, it should be noted that in Examples 11 and 12 solutions were obtained when starch was employed as the carbon source, even though there is reason to believe that the starch per se would not be soluble in the system at the temperature employed, indicating that the starch was probably modified from its original form prior to the formation of a solution. It is apparent, therefore, that it is not necessary that the carbon source be soluble in precisely the same form in which it is added.

From Example 13, it may be seen that a single compound, such as the glycerine employed in the example, may serve both as the carbon source and as the solvent, provided that the compound will decompose to form carbon upon heating and also meets the criteria set forth hereinafter for suitable solvents. Mixtures containing more than one carbon compound may, of course, be employed as the carbon source, but there is generally no advantage in doing so.

As mentioned above, the metal oxide source employed for the preparation of metal carbides according to the present invention may be an oxide of the carbide-forming metal, provided that the metal oxide is capable of dissolving in the solvent selected for the formation of the solution. Alternatively, a compound of the metal other than its oxide may be employed, provided that it is capable of dissolving in the solvent selected and that it is capable of forming an oxide of the metal upon heating. As in the case of the carbon source, it is not essential that the metal oxide source be soluble at room temperature, it being sufficient that the metal oxide source and the carbon source are mutually soluble to form a homogeneous liquid phase before substantial deposition of the metal-containing component and the carbonaceous component occurs.

In preparing a solution of a carbon source and a boric oxide source for use in producing metal borides according to the present invention, the boric oxide source may be considered as analogous to the metal oxide source employed in the preparation of metal carbides, and virtually identical considerations apply. Therefore, as suggested by Example 4, boric oxide may be employed. Alternatively, there may be used, boric acid as in Examples 21–23, or another boron compound as suggested by the use of borax in Example 5. In addition to comprising a solution of a carbon source and a boric oxide source, the dispersion which is to be heated to form a reactive mass which may be fired to yield a metal boride will also have dissolved or slurried therein a source of an oxide of a boride-forming metal. When the latter metal oxide source is present only in slurry form, rather than in solution, it preferably should be of relatively fine particle size, since the intimacy of mixture of the components in the reactive mass will, in general, be in direct proportion to the fineness of the particles.

The processes of this invention lend themselves not only to the preparation of single metal carbides and borides, but also to mixtures thereof. For example, mixtures of uranium carbide and plutonium carbide in any proportion may be produced according to the methods of Examples 18–20 by replacing some of the uranyl nitrate with a plutonium oxide source such as plutonium nitrate. By replacing all of the uranyl nitrate with plutonium nitrate, plutonium carbide would, of course, be produced.

Generally speaking, the solvent used to form the solution of the carbon source and metal oxide source, in accordance with the methods of the present invention for the production of metal carbides and borides, may be chosen from among a wide variety of solvents. Among those which have proven to be particularly useful are various polyhydric compounds such as ethylene glycol, diethylene glycol, propylene glycol and glycerine; N-methylpyrrolidone; dimethyl sulfoxide; and water. Mixtures of solvents may, of course, be employed in many cases, but it is ordinarily unnecessary to resort to solvent mixtures to obtain a solvent having the requisite characteristics. One essential criterion in selecting a suitable solvent is its ability to form a mutual solution of appropriate amounts of the carbon source and the soluble portion of the metal oxide source employed for the preparation of a specific metal carbide or boride. It is not necessary, however, that such mutual solubility of the sources be feasible at room temperature, it being sufficient that a homogeneous liquid phase forms upon heating, provided that the homogeneous liquid phase forms prior to the time that appreciable deposition of the carbonaceous and metal-containing components occurs. A second essential criterion of a suitable solvent is that in solutions made therewith, the carbon source and the soluble portion of the metal oxide source must remain in solution during the initial portion of the heating stage. The carbonaceous and metal-containing components derived in solid form from the solution should be uniformly and intimately mixed, as should any insoluble dispersed reactive component. There should be no substantial preferential deposition from solution of either the carbonaceous component or the metal-containing component, nor of the sources themselves, since this would tend to interfere with the formation of a highly intimate reactive mixture. There does not appear to be any inherent objection to some reactions which may take place between the solvent and the metal oxide source, either at room temperature or during the moderate heating. For instance, in Example 13 it is probable that the dissolution of boric acid in the glycerine was accompanied by the formation of ester-like compounds or cross-links, yet a satisfactory boron carbide product was obtained. The volume of solvent to be employed must, of course, be sufficient to dissolve the carbon source and the soluble portion of the metal oxide source, and while more may be employed, there is generally no advantage in doing so. When the solvent is also to be employed as the carbon source, however, the volume used must be selected with regard not only to solubilities, but also with due regard to stoichiometric requirements.

Since ethylene glycol is among the least expensive solvents readily available in reasonably pure form, and since it generally does not give rise to any troublesome foaming during the drying cycle at moderate temperatures, it is generally to be regarded as a preferred solvent if the sources employed for the specific metal carbide or boride to be produced are soluble therein. Water may also be considered a preferred solvent, by virtue of its low cost and ready availability in pure form, if the sources are soluble therein.

The precise amounts of the source materials to be used for the production of metal carbides or borides will depend primarily upon the carbides or borides desired. In general, the appropriate quantities may be calculated quite closely from known chemical equations for the production of metal carbides and borides by carbothermic reduction. Thus for the production of boron carbide, for example, calculations may be based upon the chemical equation $2B_2O_3 + 7C \rightarrow B_4C + 6CO$, and experimental results based upon such calculations appear to substantiate their validity in that the resultant $B_4C$ product possessed rather precise stoichiometry. However, the validity of such calculations as a basis for determining the appropriate amounts of the source materials rests upon the assumption that virtually all of the carbon in the carbon source and all of the metal in the metal oxide source is retained in the reactive mass rather than being partially dissipated during the heating. While this assumption appears to be essentially valid, practically speaking, in many of the various systems which have been studied, it is clear that the validity of this assumption will depend in large measure upon the particular solvent and source materials employed. Thus, in some systems it is conceivable that some of the carbon source or metal oxide source might be dissipated during the heating. However, such phenomena are not especially troublesome, since by employing reproducible process conditions one skilled in the art may easily arrive at the appropriate proportions of sources to be employed in producing any stoichiometric end product by suitable adjustment of the amounts calculated from the applicable chemical equation.

The order in which the solvent and source materials are mixed is, in general, unimportant. Thus, the soluble materials may be dissolved in the solvent at room temperature, or with heat; and if a metal boride is to be produced from a non-soluble source of the corresponding metal oxide, the oxide may simply be slurried in the resulting solution. Alternatively, the carbon source and metal oxide source may be dissolved separately and subsequently combined. Obviously, many other approaches are possible. However, it has generally been found most expeditious simply to combine the various materials, perhaps, though not necessarily, mixing them a bit to insure complete wetting, and then to place the mixture in an oven which is set at an appropriate temperature which is generally within the range of from about 100° C. to about 500° C. and which is specifically selected according to the requirements of the particular materials involved. Thereupon, the ingredients mix and the soluble materials form a homogeneous liquid phase, which subsequently is converted into a substantially dry reactive mass.

Depending upon the temperature of this moderate heating cycle and the ingredients employed, it may be found that during the moderate heating cycle a certain amount of chemical reaction occurs between the reactive components while they are being formed, but such reactions are not considered objectionable since upon subsequent heating the entire reactive mass is substantially completely converted to the desired product.

The reactive mass ordinarily forms as a dry, solid, often glass-like mass. Since this mass comprises an intimate mixture of the reactive components, the intact mass may be fired without further treatment, employing suitable apparatus such as a graphite vessel and an induction or tube furnace, and will generally form a fine powder of the metal carbide or boride thereupon. However, the mass is generally quite easily crushed, and it is usually preferred to break the mass into sufficiently small pieces to permit convenient loading with reasonable compactness into the graphite boat, crucible, or other vessel, in the interest of conserving furnace space. It may be noted that in Examples 18–20 the mass was crushed and then pressed into a pellet, remaining in pellet form throughout the firing. This procedure may conveniently be employed in preparing such materials as uranium carbide and plutonium carbide, for convenience in handling such radioactive materials.

Whether or not the reactive mass is crushed, it may be fired in a non-oxidizing atmosphere under conditions well known in the art for the preparation of metal carbides and borides by carbothermic reduction. In general, a time-temperature relationship is involved in such conventional firing cycles, the length of time required for conversion to the end product decreasing with increasing temperature, and this appears to be generally true for the intimate reaction mixtures of the present invention.

The metal carbide and boride products produced according to this invention were, in virtually all systems explored, obtained in the form of a fine powder, unless an inordinately high firing temperature was inadvertently employed. Many of such powders could be hot pressed without further treatment to form articles of acceptable density. In the case of the uranium carbide prepared in Examples 18–20, although the final product was purposely obtained in the form of a pellet, the pellet could easily be pulverized to a fine powder.

Except as otherwise specified, all references herein to percentages are intended to mean percentages by weight

I claim:

1. In a carbothermic reduction process for the preparation of a metal carbide or boride wherein a reactive mixture comprising a carbon source, a source of an oxide of a carbide-forming or bromide-forming metal, and where a metal boride is to be produced a boric oxide source is heated in an inert atmosphere to a sufficiently high temperature to cause reduction of said oxides and concomitant formation of a metal carbide or boride, the improvement which comprises producing said reactive mixture by forming a dispersion of a suitable carbon source and a source of an oxide of a carbide-forming or boride-forming metal and, where a metal boride is to be produced a boric oxide source, said dispersion including a mutual solution of substantially all of said carbon source and (1) where a metal carbide is to be produced, substantially all of said source of an oxide of a carbide-forming metal, or (2) where a metal boride is to be produced, substantially all of said boric oxide source.

2. A process according to claim 1 in which said dispersion is heated until a substantially dry reactive mixture is produced.

3. A process according to claim 1 in which carbon is produced in said reactive mixture by heating said dispersion.

4. A process according to claim 1 in which a substantially dry reactive mixture is formed by heating said dispersion at a moderate temperature, said moderate temperature being substantially lower than that at which said reactive mixture is heated to form the metal carbide or boride.

5. A process according to claim 4 in which said dispersion is heated at a temperature in the range from about 100 to about 500° C., for a time sufficient to form a substantially dry reactive mixture.

6. A process according to claim 1 in which said mutual solution includes as a solvent a suitable carbon source.

7. A process according to claim 1 in which said mutual solution includes a solvent other than a carbon source.

8. A process according to claim 7 in which said solvent is ethylene glycol.

9. A process according to claim 7 in which said solvent is water.

10. A process according to claim 1 in which the carbon source is a carbohydrate.

11. In a carbothermic reduction process for the preparation of a metal carbide or boride according to claim 1 wherein a reactive mixture comprising a carbon source, a source of an oxide of a carbide-forming or boride-forming metal, and where a metal boride is to be produced a boric oxide source is heated in an inert atmosphere to a sufficiently high temperature to cause reduction of said oxides and concomitant formation of a metal carbide or boride, the improvement which comprises producing said reactive mixture by forming a dispersion in a solvent of a suitable carbon source and a source of an oxide of a carbide-forming or boride-forming metal and, where a metal boride is to be produced a boric oxide source, said dispersion including a mutual solution in said solvent of substantially all of said carbon source and (1) where a metal carbide is to be produced, substantially all of said source of an oxide of a carbide-forming metal, or (2) where a metal boride is to be produced, substantially all of said boric oxide source, and heating said dispersion at a moderate temperature substantially lower than that at which said reactive mixture is heated to form the metal carbide or boride to produce said reactive mixture in a substantially dry state.

12. In a carbothermic reduction process for the preparation of a metal boride wherein a reactive mixture comprising a carbon source and a metal oxide source comprising a boric oxide source and at least one metal oxide or metal compound which will form a metal oxide under the reaction conditions is heated in an inert atmosphere to a sufficiently high temperature to cause reduction of said metal oxides and concomitant formation of a metal boride, the improvement which comprises producing said reactive mixture by forming a dispersion of a suitable carbon source and a metal oxide source, said metal oxide source consisting essentially of substantially all of a boric oxide source and substantially all of a source of at least one oxide of a boride-forming metal and said dispersion including a mutual solution of said carbon source and said boric oxide source.

13. A process according to claim 12 in which said dispersion is heated until a substantially dry reactive mixture is produced.

14. A process according to claim 12 in which said dispersion comprises a mutual solution of substantially all of said carbon source, substantially all of said boric oxide source and substantially all of a source of at least one oxide of a boride-forming metal.

15. A process according to claim 12 in which said dispersion comprises a mutual solution of substantially all of said carbon source and substantially all of said boric oxide source having slurried therein a source of at least one oxide of a boride-forming metal.

16. In a carbothermic reduction process for the preparation of a metal carbide wherein a reactive mixture comprising a carbon source and a metal oxide source comprising at least one metal oxide or metal compound which will form a metal oxide under the reaction conditions is heated in an inert atmospere to a sufficiently high temperature to cause reduction of said metal oxide and concomitant formation of a metal carbide, the improvement which comprises producing said reactive mixture by forming a mutual solution of a suitable carbon source and a source of at least one oxide of a carbide-forming metal.

17. A process according to claim 16 in which said solution is heated until a substantially dry reactive mixture is produced.

18. A process according to claim 16 in which said mutual solution includes as a solvent a suitable carbon source.

19. A process according to claim 16 in which said mutual solution includes a solvent other than a carbon source.

20. A process for the preparation of boron carbide according to claim 16 in which said mutual solution includes a source of boric oxide.

21. A process according to claim 20 in which a mutual solution of sucrose and boric acid is formed in ethylene glycol.

22. A process for the preparation of uranium carbide, plutonium carbide, or mixtures thereof according to claim 16 in which said mutual solution includes a source of uranium oxide, a source of plutonium oxide, or a mixture thereof.

(References on following page)

References Cited

UNITED STATES PATENTS

| | | | |
|---|---|---|---|
| 2,799,912 | 7/1957 | Greger | 23—208 |
| 2,964,388 | 12/1960 | Espenschied | 23—204 |
| 3,013,875 | 12/1961 | Triffleman | 23—208 |
| 3,085,863 | 4/1963 | Prener | 23—208 |
| 3,154,378 | 10/1964 | Schneider et al. | 23—349 |
| 3,249,401 | 5/1966 | Wood et al. | 23—204 |

FOREIGN PATENTS

| | | |
|---|---|---|
| 1,147,208 | 4/1963 | Germany. |
| 771,633 | 4/1957 | Great Britain. |

L. DEWAYNE RUTLEDGE, *Primary Examiner.*

CARL D. QUARFORTH, *Examiner.*

R. L. GRUDZIECKI, *Assistant Examiner.*

PO-1050
(5/69)

UNITED STATES PATENT OFFICE
CERTIFICATE OF CORRECTION

Patent No. 3,379,647      Dated April 23, 1968

Inventor(s) Paul A. Smudski

It is certified that error appears in the above-identified patent and that said Letters Patent are hereby corrected as shown below:

Column 1, line 50, -- are -- has been inserted after "state". Column 2, line 16, "2300C." has been changed to -- 2300°C. --; line 19, -- a -- has been inserted before "protective". Column 6, line 34, "reaction" has been changed to -- reactive --. Column 8, line 56, -- to -- has been inserted after "thereto". Column 9, line 15, "to" has been changed to -- of --; line 62, "200°C." has been changed to -- 2000°C. --. Column 13, line 24, "bromide-forming" has been changed to -- boride-forming --. Column 14, lines 24-25, "substantially all of" has been canceled; line 25, "substantially all of" has been canceled; line 27, -- substantially all of -- has been inserted after "of"; line 28, -- substantially all of -- has been inserted after "and".

SIGNED AND
SEALED
AUG 11 1970

(SEAL)
Attest:

Edward M. Fletcher, Jr.
Attesting Officer

WILLIAM E. SCHUYLER, JR.
Commissioner of Patents